United States Patent
White et al.

(10) Patent No.: US 10,257,197 B2
(45) Date of Patent: Apr. 9, 2019

(54) PRIVATE DATA ACCESS CONTROLS IN MOBILE APPLICATIONS

(71) Applicant: SAP SE, Walldorf (DE)

(72) Inventors: Mark Stephen James White, Basingstoke (GB); Jyothi Krothapalli, Princeton, NJ (US); David Clegg, Altadena, CA (US)

(73) Assignee: SAP SE, Walldorf (DE)

( * ) Notice: Subject to any disclaimer, the term of this patent is extended or adjusted under 35 U.S.C. 154(b) by 301 days.

(21) Appl. No.: 15/210,429

(22) Filed: Jul. 14, 2016

(65) Prior Publication Data

US 2018/0020001 A1 Jan. 18, 2018

(51) Int. Cl.
*H04L 29/06* (2006.01)
*G06F 21/60* (2013.01)

(52) U.S. Cl.
CPC ............ *H04L 63/10* (2013.01); *G06F 21/602* (2013.01); *G06F 21/604* (2013.01); *H04L 63/0428* (2013.01); *H04L 63/08* (2013.01)

(58) Field of Classification Search
CPC ..... H04L 63/10; H04L 63/0823; H04L 63/20; G06F 21/604; G06F 21/602
See application file for complete search history.

(56) References Cited

U.S. PATENT DOCUMENTS

| | | | | |
|---|---|---|---|---|
| 8,646,032 B2 * | 2/2014 | Aad | ...................... | G06F 21/604 709/223 |
| 9,419,841 B1 * | 8/2016 | Kozolchyk | ........... | H04L 9/3239 |
| 9,959,417 B2 * | 5/2018 | More | ..................... | G06F 21/554 |
| 2011/0119481 A1 * | 5/2011 | Auradkar | ............ | G06F 21/6209 713/150 |
| 2013/0055357 A1 * | 2/2013 | Etchegoyen | ............ | G06F 21/34 726/4 |
| 2014/0075493 A1 * | 3/2014 | Krishnan | ................ | G06F 21/31 726/1 |
| 2014/0245015 A1 * | 8/2014 | Velamoor | ............ | H04L 63/061 713/171 |

(Continued)

OTHER PUBLICATIONS

Yu et al., Achieving Secure, Scalable, and Fine-grained Data Access Control in Cloud Computing, 2010, IEEE, 9 Pages (Year: 2010).*

(Continued)

*Primary Examiner* — Christopher C Harris
(74) *Attorney, Agent, or Firm* — Schwegman Lundberg & Woessner, P.A.

(57) ABSTRACT

In an example embodiment, a request for data is received from an end-user device, the request including one or more contextual attributes of the end-user device. The request is forwarded to a data provider. Data is then received from the data provider. It is determined if the data includes tagged sensitive data. If so, then the tagged sensitive data and the one or more contextual attributes are sent to a data access platform. Then policy constraints corresponding to the data are received from the data access platform. The sensitive data is encrypted in a manner that a data privacy module on the end-user device only decrypts the sensitive data when one or more contextual attributes of the end-user device meet one or more requirements identified in the policy constraints, and then the encrypted sensitive data and the policy are sent to the data privacy module.

20 Claims, 8 Drawing Sheets

(56) References Cited

U.S. PATENT DOCUMENTS

| | | | |
|---|---|---|---|
| 2017/0039379 A1* | 2/2017 | Skipper | G06F 21/6209 |
| 2017/0147825 A1* | 5/2017 | Barton | G06F 21/602 |
| 2017/0237747 A1* | 8/2017 | Quinn | H04L 63/107 |
| | | | 726/29 |
| 2017/0272472 A1* | 9/2017 | Adhar | H04L 63/205 |

OTHER PUBLICATIONS

Goyal et al, Attribute-Based Encryption for Fine-Grained Access Control of Encrypted Data, 2006, ACM. 10 Pages (Year: 2006).*

Akinyele et al, Securing electronic medical records using attribute-based encryption on mobile devices, Oct. 2011, ACM, 12 Pages (Year: 2011).*

* cited by examiner

PRIVATE DATA ACCESS CONTROLS IN MOBILE APPLICATIONS

TECHNICAL FIELD

This document generally relates to systems and methods for computer software for mobile applications. More specifically, this document relates to private data access controls in mobile applications.

BACKGROUND

As computing devices are becoming more prevalent and more portable, there is an increasing need to preserve the security and privacy of certain types of data. For example, in the healthcare field, a patient's private health information used to be limited to physical paper documents stored in a file or chart at a medical facility. Security of these documents, therefore, was easier to maintain as unless another physical copy of the document was made, the data was all stored in one place. More recently these documents have now migrated to electronic format, it is much easier for multiple copies of the documents to be located on different machines, some of which may not be secure. For example, healthcare/patient data is now easier to access at the point of care though mobile devices, but the mobile access introduces a situational or other contextual aspect that may not match the privacy of the data in its original setting. Patients have a right to expect their data is accessed and used appropriately based on specific situations or contexts and not just anytime, anywhere an authorized mobile application requests it.

Existing technical solutions to this problem involve authorization and access controls. These controls implement various computer networking security techniques such as encryption and identity recognition (e.g., user names and passwords) to prevent unauthorized individuals from accessing data. These solutions, however, lack the technical ability to prevent an otherwise authorized or authenticated individual from accessing or viewing data in contexts that would not be appropriate. For example, it may be appropriate for a physician to view a hospital patient's private medical information on a tablet computer while making rounds at the hospital, but it may not be appropriate for that physician to view the hospital patient's private medical information at home, or using a different device, etc. This problem may be exacerbated by the fact that some applications are designed to operate in offline mode, without connection to networks such as the Internet. Such applications may be authorized to download and display confidential information while connected but then subsequently still be able to display the downloaded confidential information while offline. One solution might be to prevent display of the confidential information while the application is in offline mode, but this does not take into account situations where the application might be otherwise permitted to display the data despite operating in offline mode (e.g., when the mobile device is in an area of a hospital with poor connectivity). There currently is no technical mechanism for data to be restricted based on contextual information.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an extension is provided to a mobile application access control mechanism that takes into account dynamic, situational, locational, environmental, or other context of the data when it is used. A mechanism to enforce specific preferences of data providers/owners for data usage may also be provided. When using the extension, mobile applications request data, but the data is specially tagged and the specially tagged data is passed through a mobile data privacy service, which acts as a filter for private and sensitive data. Any request for access to data tagged as private or sensitive can be evaluated, alongside the context of the user/application/device making the request, against data access policies for the data. These data access policies may be used to assess approval for use of the data in the context at hand, or to identify obligations or advice over the use of the private or sensitive data in this context. Private and sensitive data can then be returned in encapsulated form to the mobile device. The data capsule allows access to the data only when the context in which the data was requested is maintained, or within required boundaries. Obligations maintained in the data capsule may, for example, require the mobile application to further restrict the visibility of data as it is presented or used on the mobile device.

Thus, using dynamic attributes and fine-grained contexts, a mobile application can better guarantee the appropriate access to individual pieces of private and sensitive data that may be subject to variability in the need-to-know aspect of security and privacy controls. This mechanism can be used as a tool for enhancing the protection of personal data, restricting misuse, and to provide audit trails to help provide transparency in the use of that information, especially in the mobile setting.

Additionally, a cloud service can be linked to existing mobile services to allow customers (e.g., data providers) to integrate additional fine-grained data access controls into their mobile applications without changing their source systems or data. This allows customers to quickly react to the changing dynamics in the field of data security and privacy. For example, more and more countries are beginning to regulate use of private data, and to continually update those regulations. The flexible and robust nature of the mobile privacy data service allows customers to quickly react to such regulations and their updates.

Figure 1:
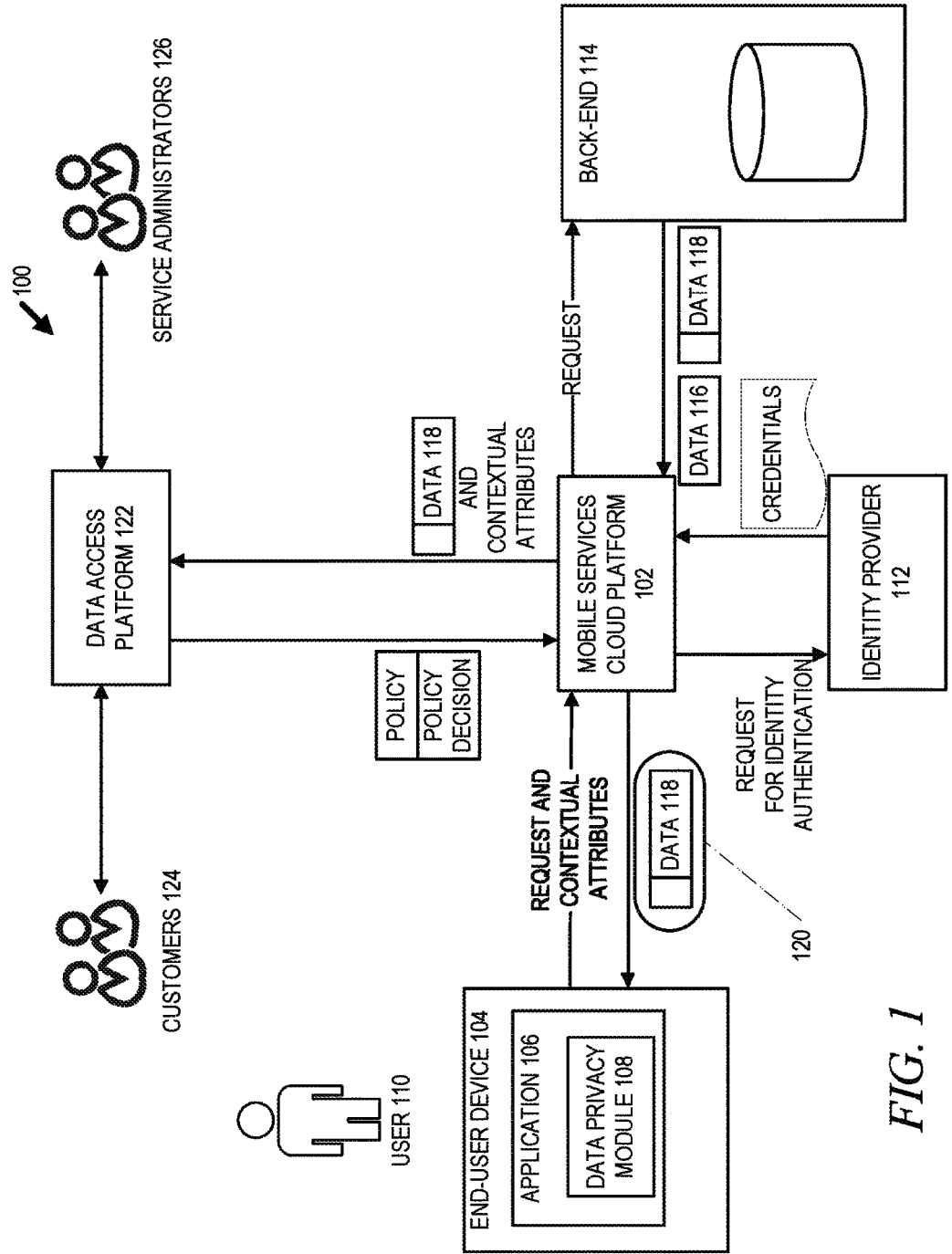
FIG. 1 is a block diagram illustrating a system, in accordance with an example embodiment, for providing mobile data privacy.

FIG. 1 is a block diagram illustrating a system 100, in accordance with an example embodiment, for providing mobile data privacy. The system 100 includes a mobile services cloud platform 102 that provides a cloud-based mobile platform to securely connect to back-end business systems. An example of a mobile services cloud platform 102 is the HANA Cloud Platform mobile services (HCPms) from SAP SE. The mobile services cloud platform 102 allows application developers to create applications including procedures in libraries in a software developers kit (SDK) and distribute the applications to end-user devices 104. The mobile services cloud platform 102 also can coordinate combinations to and from the applications running on end-user devices 104.

In FIG. 1, application 106 has been distributed to end-user device 104 by the mobile services cloud platform 102. The application 106 includes a data privacy module 108. This data privacy module 108 may be thought of as a plug-in to the application 106. The data privacy module 108 acts to enforce privacy policies on data that is attempting to be accessed by the application 106.

When the application 106 requests secure access to data, a user 110 of the end-user device 104 may be authenticated. Based on the application configuration within the mobile services cloud platform 102, the user 110 authenticates with a security service, such as a Security Assertion Markup Language (SAML) Identity Provider 112. At the time of this authentication request, contextual information may be passed about the end-user device 104. This contextual information will be described in more detail below, but could include information such as Internet Protocol (IP) address, physical location of the end-user device 104, the application 106/function for which the data is being requested, or any other information that defines the context of the data access.

Once authenticated, the user credentials may be propagated into a back-end 114 for data access. However, in order for security/privacy controls to be in place, this operation attempts to identify sensitive data so that it can go through subsequent attribute-based access control (ABAC) checks. What specific data is regarded as sensitive can vary from country to country, state to state, or even company to company. This sensitive information may not be limited to merely personally identifiable information, but can incorporate any type of sensitive data.

In one example embodiment, the mobile services cloud platform 102 may store an OData Uniform Resource Identifier (URI) to identify an EntityType and property that may be considered sensitive. This may be called a tag. Here data 116 is depicted as clean, and thus is not sensitive data whereas data 118 is depicted as tagged, and thus is sensitive data. When this sensitive data 118 is retrieved and identified as tagged, it can then be placed in an encrypted capsule 120.

The encrypted capsule 120 ensures that the piece of data 118 is only subsequently viewed by the user 110 in a context that meets the boundaries of the policy constraints and requirements (just as the context did when the original request was made). This helps prevent, for example, a user 110 from requesting the data 118 in a location in which viewing the data 118 is permitted and then moving to a location in which viewing the data 118 is not permitted.

In other example embodiments, there may be alternative mechanisms to identify sensitive data, such as through information held in a data access platform 122 itself, or within an OData service being accessed.

When it is determined that a piece of sensitive data is being requested, one or more policies associated with that piece of sensitive data may be obtained. While a tagged piece of data 118 may indicate that the data 118 is potentially sensitive, it does not inform as to whether the data 118 is, for example, private and allowed in the current context of the end-user device 104, private and not allowed in the context of the end-user device 104, not considered private in the context of the end-user device 104, or other potential policy outcomes (e.g, certain types of sensitive data may permit emergency overrides, e.g., in life-threatening medical emergencies). How this determination is made can be based on a whole set of context information available, including data 118 based in an entity (so that customer or related information can be identified), information on the specific user 110 requesting the data 118 and how, situational or environmental information, or any other relevant context. The policies may be maintained by the data access platform 122 and access based on the policies may be requested by the mobile services cloud platform 102. If private access is allowed, a token or key may be returned by the data access platform 122 to the mobile services cloud platform 102, which then may embed this token or key in the encrypted capsule 120 to be returned to the end-user device 104. This enforces that the end-user device 104 can only open the capsule 120 in a context that matches the context when the original request was made. If private access is disallowed, then the encrypted capsule 120 may be emptied, but still passed onto the device.

All non-sensitive data may be returned alongside all the encapsulated sensitive data to the end-user device 104 for viewing. The data privacy module 108 recognizes sensitive and private data and reacts and processes the appropriate encapsulated data. As long as the context has not changed and the token or key not expired, the data privacy module 108 allows the encrypted capsule 120 to be opened and displayed.

In addition to basic display of data 118, additional obligations on viewing the data 118 may be included in the policies and enforced by the data privacy module 108. For example, if the data 118 is visual in nature, restrictions may be placed on the display on which the data 118 may be viewed. For increased privacy when viewing sensitive data, for example, an obligation may require that the data 118 only be viewed using a headset or video-enabled glasses rather than, for example, on a tablet or smartphone where anybody walking by the user 110 can also view the data 118. Likewise, for audio data, the obligation may require that the data 118 only be listened to using headphones as opposed to a speaker. Other obligations may be even more complex. For example, a policy may require that the end-user device 104 take steps to ensure that no other people are around the user 110 before allowing viewing, such as by monitoring one or more input devices or sensors on the end-user device 104 (e.g., using a built in microphone to listen for indications of other people, activating a built-in camera to determine whether more than one person is visible, etc.).

Within the data access platform 122, user interfaces (UIs) may be provided to customers 124 and service administrators 126. For customers 124, these UIs can be used to manage specific data protection rights against specific services they use. Customers 124 could consider different levels of trust across different organizations, for example, and so disallow one while allowing another. Customers 124 could also track the requests for use of their data 118, as the data access platform 122 can track all data requests and maintain audit trails, allowing both customers 124 and company administrators 126 access to histories. Customers 124 could also review terms and conditions and be informed of changed terms and conditions. These terms and conditions define rights and obligations of use of the data 118 and thus new regulations can indicate changes to these terms and conditions to be communicated to the customer 124.

Service administrators 126 could maintain company ABAC approval policies, manager customer specific settings, review audit logs, perform regulatory requests, and create and upload terms and conditions.

A new term will be discussed here called "data-in-situ". Data-in-situ refers to data that is in place on a computing device in a particular situational context. This is in contrast to, for example, data-at-rest, which refers to data at a source provider and data-in-motion, which refers to data that is being transferred from system or device to system or device. Another term sometimes utilized is "data-in-use," which is commonly applied to data that is residing in memory being referenced by the application and is easily and readily accessible by the application. Data-in-situ may be considered to be an extension of "data-in-use" to allow for all the mobile context and characteristics to apply to its usage.

As described above, in order to ensure that privacy and security controls are enforced on data-in-situ, in an example embodiment various operations are taken to secure the data for viewing only in particular situational contexts (and, if necessary, only in ways specified by obligations). Once an application 106 has authenticated itself to a data source through mobile services cloud platform 102, the application 106 makes a request for data through the mobile services cloud platform 102. Inside this request are a number of environmental context attributes added to the already provided authenticated session level information.

The mobile services cloud platform 102 processes the data request and identifies that items of data 118 in the result require additional privacy controls in order for the data 118 to be used in specific mobile-access situations ("sensitive data"). Then, to ensure that the sensitive data is only used by the same application 106 that made the request and in the situational context in which the request was made, the sensitive data is encapsulated and encrypted by the mobile services cloud platform 102. In an example embodiment, this encapsulation and encryption may occur at two layers. First, at a layer called "policy and context ciphertext," the goal is to ensure, as best as possible, that the policy decision by the mobile services cloud platform 102 can be trusted, guaranteed, and not easily accessible. The policy decision and context requirements for access are encrypted (or digitally signed) to allow for integrity and non-repudiation. This ensures that the application 106 can trust the policy decision and be sure that the context requirements have not been tampered with.

The second layer is called "identity and data ciphertext." Here, the goal is to ensure that the sensitive data is only accessible if the policy access restrictions are validated in the current context and then only made available to the specific identity (application 106, device, plugin, etc.) that made the original request for it.

Figure 2:
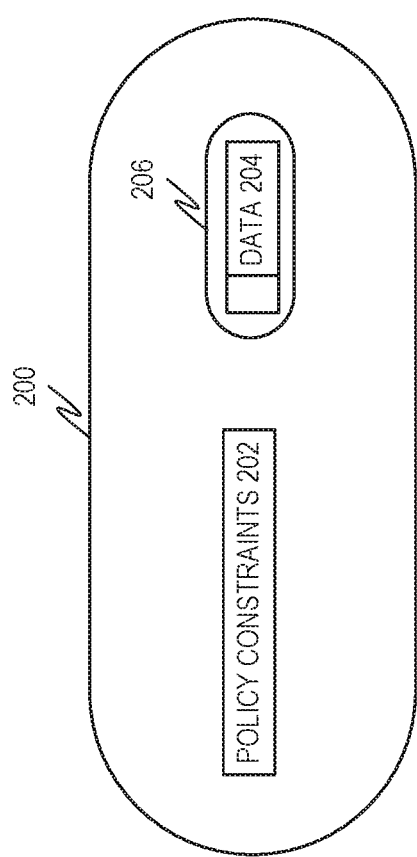
FIG. 2 is a block diagram illustrating a type of encapsulation in accordance with an example embodiment.

The sensitive data itself is additionally and separately encrypted such that only the specific device application 106 associated with the specific request is allowed to access that private data. In other words, the goal is to lock the sensitive data down to the same application 106 and request context. In an example embodiment, the encrypted sensitive data is itself contained in the policy encryption, so that it cannot be accessed independently. FIG. 2 is a block diagram illustrating this type of encapsulation. As can be seen, the first layer of encryption 200 encrypts the policy constraints 202 and the sensitive data 204 and the second layer of encryption 206 encrypts the sensitive data 204 itself.

Thus, by protecting the sensitive data 204 in this manner, data-in-situ privacy controls allow for validation of the situational context while the data resides on the mobile device, without needing to re-request the data. When data is attempted to be accessed, device-side logic is used to understand that any sensitive data 204 contained within it requires the validation of the current situational context in order to access it. This logic may be embedded in a data privacy module 108.

The data privacy module 108 decrypts the policy decision ciphertext, revealing the decision and context requirements. Then the data privacy module 108 contains the current contextual attributes of the application 106/device 104/user 110 and compares these contextual attributes with the context requirements. It should be noted that the context requirements can be expressed in any number of different manners, including, for example, fixed requirements, conditions (sets of requirements), fuzzy requirements, etc. Additionally, one or more obligations may be specified (e.g., conditions on display).

If there is no appropriate context match, or an explicit policy denial, then the data privacy module 108 stops access to the sensitive data 204, with correct warnings presented to the user 110/application 106.

If there is an appropriate context match, then the sensitive data ciphertext is decrypted and passed to a display module inside the data privacy module 108. If there are display obligations placed on the private data, these are enforced by the display module. Examples of such obligations include, but are not limited to, only display through certain access points (e.g., glasses, watch, headset), only display temporarily for fixed period, obfuscate the display, but show the data temporarily if a touchscreen is tapped, etc.

Figure 3:
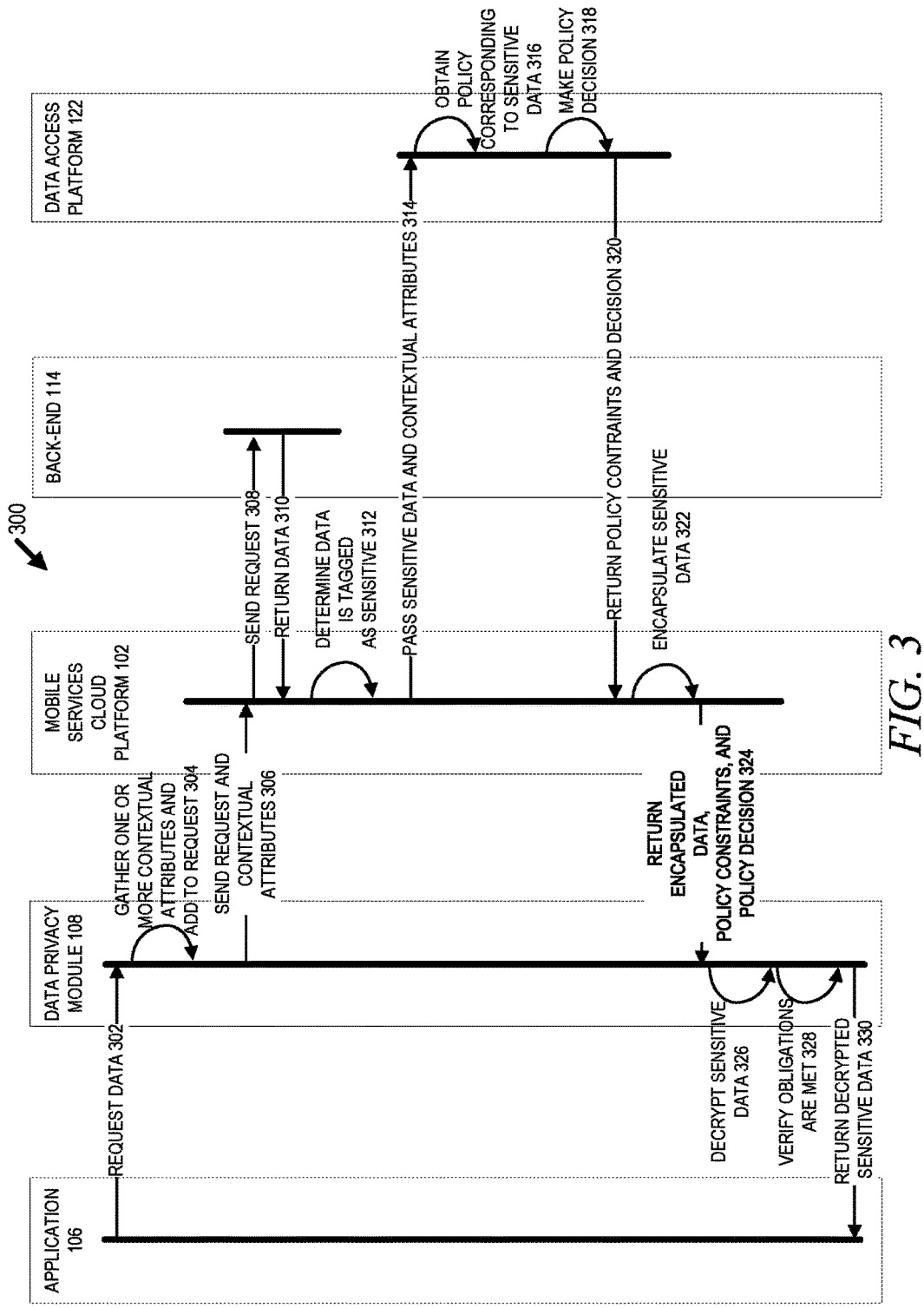
FIG. 3 is an interaction diagram illustrating a method of handling requests for data from a data privacy module 108 in accordance with an example embodiment.

FIG. 3 is an interaction diagram illustrating a method 300 of handling requests for data from a data privacy module 108 in accordance with an example embodiment. The method utilizes an application 106, data privacy module 108, mobile services cloud platform 102, back-end 114, and data access platform 122. As described above, the role of the data privacy module 108 is to manage access to any sensitive data 204 and to enforce obligations on using this sensitive data 204 in the application 106. The method 300 assumes that the application 106 resides on an end-user device 104 that has already been authenticated.

At operation 302, a request for data is received at the data privacy module 108 from the application 106. At operation 304, one or more contextual attributes are gathered by the data privacy module 108 and added to the request. These attributes may include contextual attributes. Attributes may include, but are not limited to, authority context attributes, request context attributes, environmental context attributes, and user context attributes. Authority context attributes include contextual information about a user 110 or device's authority to view data. This may include attributes such as a public key, session information, and roles. Request context attributes include contextual information about the request itself, such as the data source from which the data is requested, parameters of the request, wildcards in the request, etc. Environmental context attributes include contextual information about the device or application 106 making the request, such as global positioning system (GPS) coordinates, logical application identification, logical screen/process identification, physical device facilities enabled/disabled (e.g., Bluetooth, near field communication (NFC), WiFi, Airdrop™), physical device capabilities (e.g., headset attached, glasses linked, watch linked), emergency access, and version of the data privacy module 108 installed on the device. User contextual information may include interaction status (e.g., active vs. passive, driving versus not driving), etc.

In an example embodiment, the data requests are made through a fixed and identifiable access point in the application 106, which can interact with the appropriate sensors to gather contextual attributes.

It should be noted that the data privacy module 108 may be considered to be part of the application 106, as in some example embodiments the inclusion of the data privacy module 108 as part of a library in an SDK means that the application 106, when compiled, includes both the data privacy module 108 and other aspects of the application 106 (as well as any other modules selected by the application 106 designed from the library in the SDK). Nothing in this figure shall be interpreted as contrary to such an embodiment.

It should also be noted that the selection of which contextual attributes are gathered by the data privacy module 108 may be made by the application designer. In some example embodiments, however, the data privacy module 108 is designed to gather as many contextual attributes as possible that reasonably are foreseen as being useful for a data privacy policy. This is because at the time that operation 304 is performed, the data privacy module 108 likely does not know the contextual attributes that the policy constraints 202 for the requested data will use, as the policy constraints 202 likely have not been downloaded to the data privacy module 108 yet. As such, data privacy module 108 may be programmed to make a "best guess" as to what contextual attributes may be relevant to the ultimate policy for the data and gather those contextual attributes.

At operation 306, the data privacy module 108 sends the request, including the contextual attributes, to the mobile services cloud platform 102. At operation 308, the data privacy module 108 sends the request to the back-end 114. It should be noted that the back-end 114 may itself be the provider of the requested data, or may be a component designed to send the request to the provider of the requested data and receive back the requested data from that provider.

At operation 310, the data privacy module 108 receives data from the back-end 114, responsive to the request. At operation 312, the data privacy module 108 checks to see if this data is tagged as sensitive. If not, it may simply send the non-sensitive data 204 to the application 106. For purposes of this figure, however, it will be assumed that the data is sensitive. At operation 314, the sensitive data 204 (or at least an identification thereof) is passed to the data access platform 122 along with the contextual attributes. At operation 316, the data access platform 122 obtains policy constraints 202 corresponding to the sensitive data 204. At operation 318, the data access platform 122 makes a policy decision based on the policy constraints 202 and the contextual information. This may include, for example, comparing the contextual information to one or more contextual information rules or guidelines in the policy constraints 202. At operation 320, the data access platform 122 returns the policy decision and the policy constraints 202 to the mobile services cloud platform 102.

At operation 322, assuming the policy decision was to permit access to the data, the mobile services cloud platform 102 encapsulates the sensitive data 204. This encapsulation involves encrypting or otherwise protecting the sensitive data 204 (or at least the sensitive part of the data). For example, the following is a simple set of data:

```
{
    "name" : "John Doe",
    "salary" : 10000.00
}
```

If the "salary" field has been tagged as a piece of sensitive data 204, then policies define the use of this field as "data-in-situ" and mobile services cloud platform 102 encapsulates the sensitive data 204 as follows:

```
{
    "name" : "John Doe",
    "salary" : {
        "hcpmsPrivateDataCapsule" :
        "a54d88e06612d820bc3be72877c74f257b561b19"
    }
}
```

As can be seen, the value of the salary field has been replaced by ciphertext representing a private data capsule or envelope with the field name "hcpmsPrivateDataCapsule."

At operation 324, the encapsulated data, policy constraints 202, and policy decision are returned to the data privacy module 108. At operation 326, when the data is to be used by the application 106 (for example, when it is displayed, played, or used in a non-visual background process), the data privacy module 108 decrypts the data. To this, a cryptography mechanism is used. For example, the decrypted data may be expanded to the following:

```
{
"name": "John Doe",
"salary": {
  "hcpmsPrivateDataCapsule" :
    "policy": {
      "decision": "allow",
      "context": {
        "restrictions": [
          { "geoip": { "lat": 53.437, "lon": –5,625 } },
          { "appid": "com.sap.hr.remote.access" },
          { "processid": "employee-display" },
          { "device": { "capabilities":
            [ { "bluetooth": "disabled" }, { "airdrop": "disabled" } ] } },
          { "emergency": "false" }
        ]
      },
      "conditions": [
        "AND",
        { "context" : "geoip.lat", "value": 49.275, "op": "gt" },
        { "context" : "geoip.lat", "value": 57.804, "op": "lt" },
        { "context" : "geoip.lon", "value": –14,414, "op": "gt" },
        { "context" : "geoip.lon", "value": 0.351, "op": "lt" }
      ],
      "fuzzy": [
        "FUZZY", { "appid": "com.sap.hr.*" }
      ],
```

-continued

```
    "obligations": [
      { "obfuscate": { "period": "s", "value": 5 } }
    ],
    "validity": {
      "expires": { "period": "w", "value": 1 },
    }
  },
  "privatedata" : "41c91b43727a2821449e6a1c62420b62"
  }
 }
}
```

It should be noted that the decrypted data is not persistently stored on the end-user device 104. Rather, if persistent storage is desired (so that, for example, the sensitive data 204 can be used in an offline mode), then it is persistently stored in encrypted form and the decryption process described above is used each time access is requested. This helps ensure that the policy constraints 202 are enforced properly even if contextual attributes change. The contextual attributes are validated on each and every access and display, thus enforcing the policy constraints 202.

At operation 328, the data privacy module 108 ensures that any obligations defined by the policy constraints 202 are met. This operation may also be performed each time access is requested to the data. In the above example, the policy constraints 202 indicate that the sensitive data 204 is obfuscated on the display, until it is directly tapped/selected by the user 110 of the application 106, at which time it is displayed for 5 seconds before reverting to its obfuscated value. At operation 330, the decrypted sensitive data 204 is returned to the application 106 for display, play, or other use.

Figure 4:
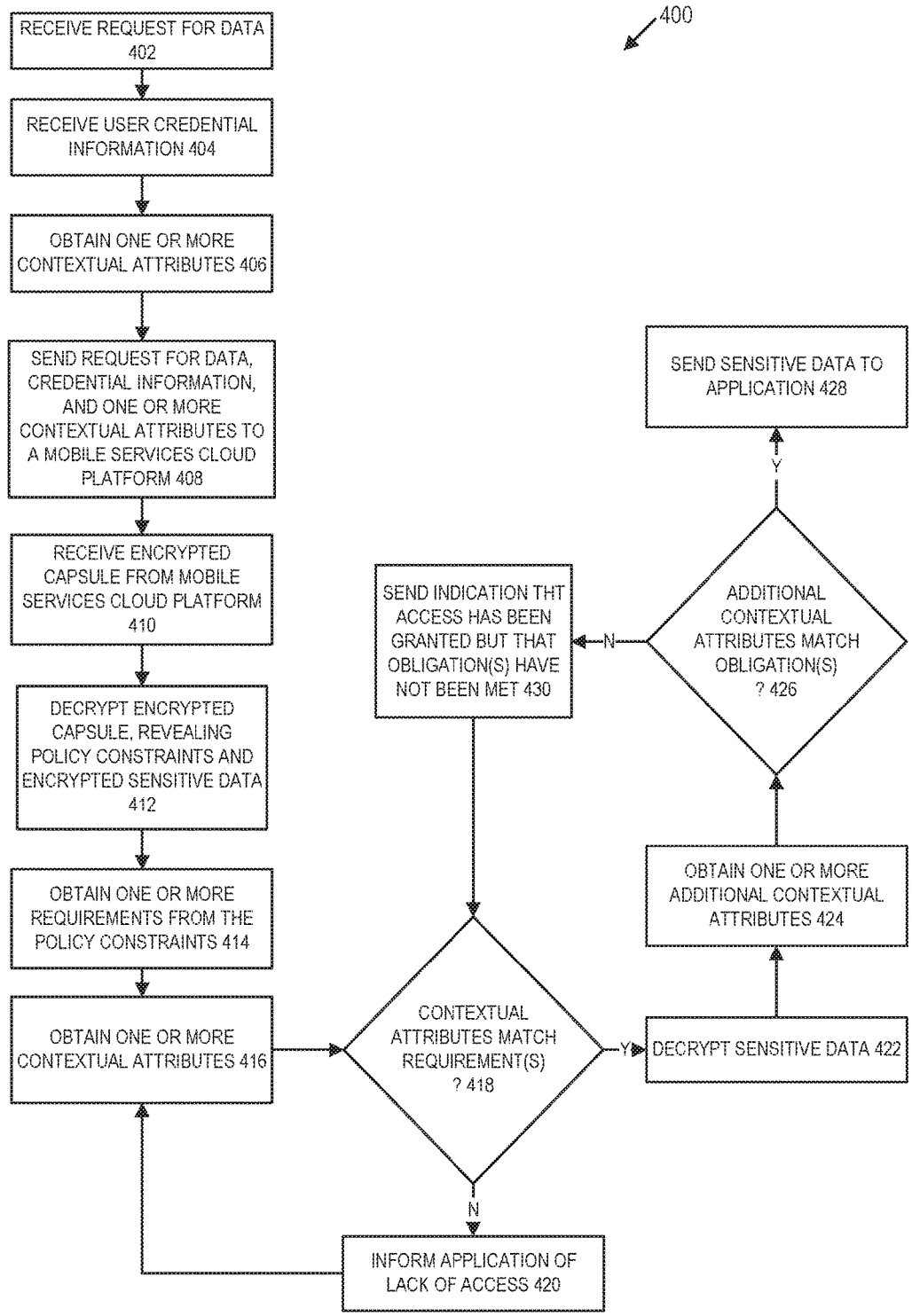
FIG. 4 is a flow diagram illustrating a method for handling a request for data in accordance with an example embodiment.

FIG. 4 is a flow diagram illustrating a method 400 for handling a request for data in accordance with an example embodiment. This method 400 may be performed at, for example, a data privacy module 108 of an application 106 running on an end-user device 104. At operation 402, a request for data is received. This request may, for example, be generated by the application 106 (based on, for example, user interaction with a graphical user interface, or simply underlying needs of the application 106). At operation 404, user credential information may be received. This user credential information may include information aiding in identifying that the user 110 has appropriate rights to access the data. Examples of such credential information may include a username and password. It should be noted in some example embodiments the credential information itself may only need to be received once, and subsequent requests for data from the same device/user need only identify the previously credentialed device/user. For example, the first time an application requests data in a session the user may be prompted for a user name and password, but subsequent requests in the same session need only transmit a session identifier. In that respect, the session identified may itself be thought of as a user credential.

At operation 406, one or more contextual attributes are gathered. These one or more contextual attributes may be obtained by, for example, interacting with the application 106 or other elements of the end-user device 104, such as an operating system and/or various sensors and hardware modules on the end-user device 104 (e.g., GPS module). At operation 408, the request for data, the credential information, and the one or more contextual attributes are sent to a mobile services cloud platform 102. Actions taken by the mobile services cloud platform 102 are described in more detail below with respect to FIG. 5.

At operation 410, an encrypted capsule 120 is received from the mobile services cloud platform 102. At operation 412, the encrypted capsule 120 is decrypted, revealing policy constraints 202 and encrypted sensitive data 204. At operation 414, one or more requirements are obtained from the policy constraints 202. At operation 416, one or more contextual attributes are obtained. These attributes may be the same as were obtained in operation 406 or, alternatively, may be a subset of the attributes obtained in operation 406, specifically including only attributes referenced by the one or more requirements. Operation 416 allows for values of the attributes to have changed since operation 406 and for the updated values to be recognized. At operation 418, the one or more contextual attributes are compared to the one or more requirements in the policy constraints 202 to determine if access to the sensitive data 204 is permitted. If not, then at operation 420, the application 106 is informed of the lack of access and may act accordingly (such as, for example, displaying an error to the user 110). If so, then at operation 422, the sensitive data 204 is decrypted.

At operation 424, one or more additional contextual attributes are obtained. These contextual attributes may be those relevant to one or more obligations contained in the policy constraints 202. At operation 426, the one or more additional contextual attributes are compared to the one or more obligations in the policy constraints 202 to determine if the obligations are met. If so, then at operation 428, the sensitive data 204 is sent to the application 106. If not, then at operation 430, an indication that access has been granted but that the one or more obligations have not been met is sent to the application 106. The method 400 then loops back to operation 418.

Figure 5:
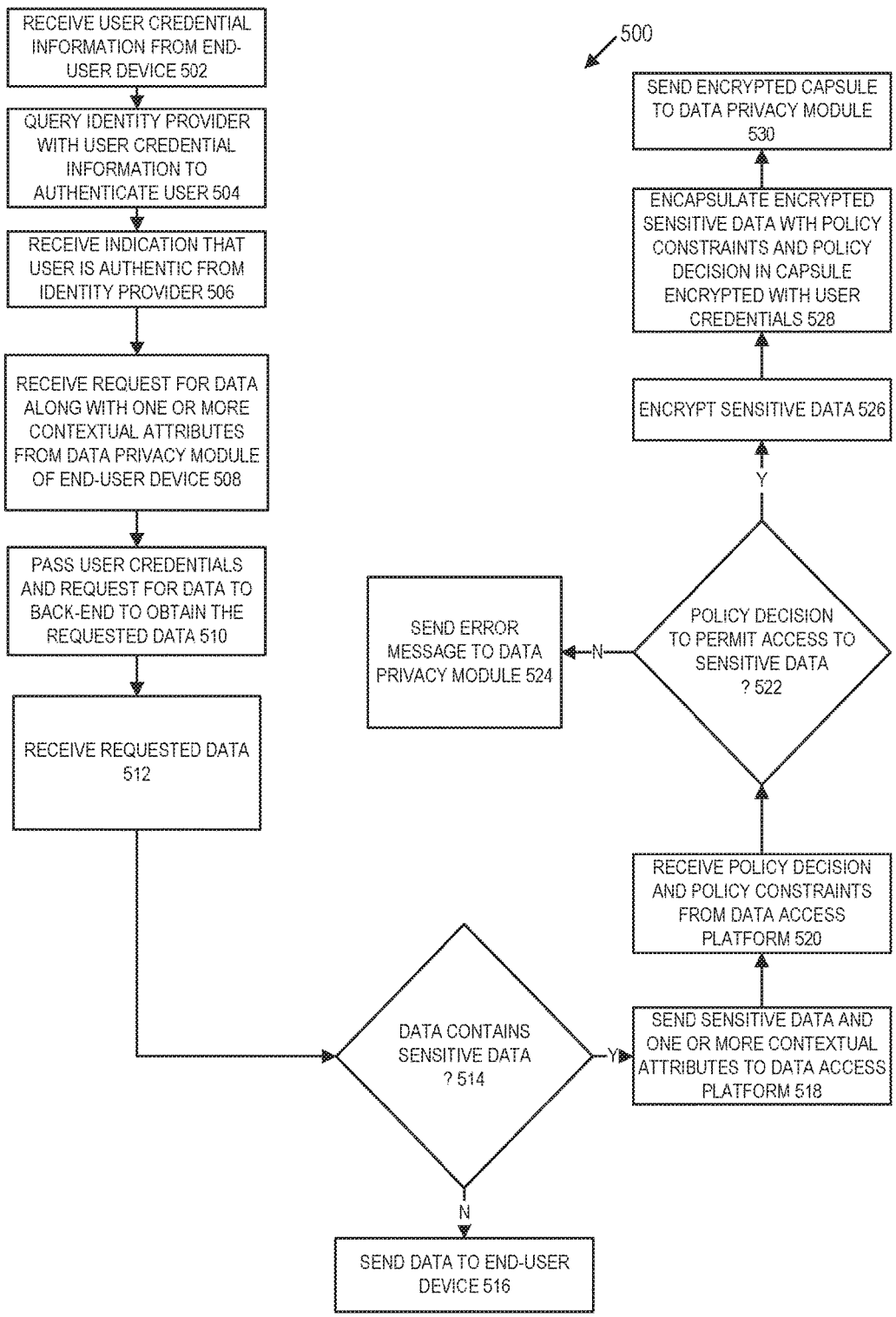
FIG. 5 is a flow diagram illustrating a method for handling a request for data in accordance with another example embodiment.

FIG. 5 is a flow diagram illustrating a method 500 for handling a request for data in accordance with another example embodiment. This method 500 may be performed at, for example, a mobile services cloud platform 102.

At operation 502, user credential information is received from an end-user device 104. At operation 504, an identity provider 112 is queried with the user credential information to authenticate a user 110 of the end-user device 104. At operation 506, an indication that the user 110 of the end-user device 104 is authentic is received from the identity provider 112.

At operation 508, a request for data along with one or more contextual attributes are received from a data privacy module 108 on the end-user device 104. At operation 510, the user credentials and the request for data are passed to a back-end 114 to obtain the requested data. At operation 512, the requested data is received. At operation 514, it is determined whether the requested data contains sensitive data 204. This may be performed by, for example, determining if any pieces of information in the requested data have been tagged as sensitive.

If not, then at operation 516 the requested data sent to the end-user device 104.

If so, then at operation 518, the sensitive data 204 (whether part or all of the requested data) and the one or more contextual attributes are sent to a data access platform 122. The operations of the data access platform 122 are described in more detail below with respect to FIG. 6.

At operation 520, a policy decision and policy constraints 202 are received from the data access platform 122. At operation 522, it is determined if the policy decision was to permit access to the sensitive data 204. If not, then at operation 524, an error message is sent to a data privacy module 108 on the end-user device 104. If so, then at operation 526 the sensitive data 204 is encrypted. At operation 528, the encrypted sensitive data 204 is encapsulated with the policy constraints 202 and the policy decision in an encrypted capsule. At operation 530, the encrypted capsule 120 is sent to the data privacy module 108 on the end-user device 104.

Figure 6:
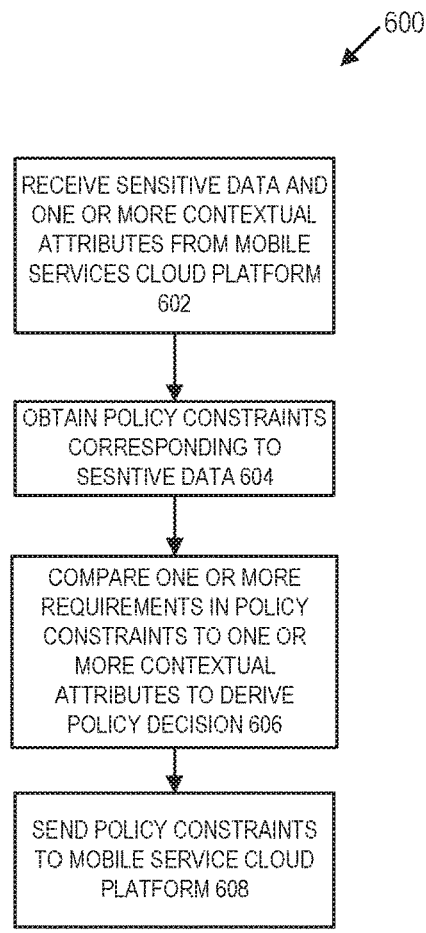
FIG. 6 is a flow diagram illustrating a method for handling a request for data in accordance with another example embodiment.

FIG. 6 is a flow diagram illustrating a method 600 for handling a request for data in accordance with another example embodiment. This method 600 may be performed at, for example, a data access platform 122.

At operation 602, sensitive data 204 and one or more contextual attributes are received from a mobile services cloud platform 102. At operation 604, policy constraints 202 corresponding to the sensitive data 204 is obtained. This may be obtained by, for example, using an identifier stored in the sensitive data 204 to retrieve policy constraints 202 containing the same identifier. At operation 606, one or more requirements in the policy constraints 202 are compared to the one or more contextual attributes to derive a policy decision. At operation 608, the policy constraints 202 are sent to the mobile services cloud platform 102.

EXAMPLES

Example 1

A system comprising:
a mobile services cloud platform 102 comprising one or more processors 110 configured to:
receive, from an end-user device 104, a request for data, the request including one or more contextual attributes of the end-user device 104;
forward the request for data to a data provider;
receive the data from the data provider;
determine if the data from the data provider includes tagged sensitive data 204;
in response to a determination that the data from the data provider includes tagged sensitive data 204;
send the tagged sensitive data 204 and the one or more contextual attributes to a data access platform 122;
receive, from the data access platform 122, policy constraints 202 corresponding to the data;
encrypt the sensitive data 204 in a manner that a data privacy module on the end-user device 104 only decrypts the sensitive data 204 when one or more contextual attributes of the end-user device 104 meet one or more requirements identified in the policy constraints 202; and
send the encrypted sensitive data 204 and the policy constraints 202 to the data privacy module 108 on the end-user device 104.

Example 2

The system of example 1, wherein the mobile service cloud platform 102 is further configured to:
authenticate a user 110 of the end-user device 104 by passing user credentials to an identify provider 112 and receiving an indication that the user 110 is authentic.

Example 3

The system of example 1 or 2, wherein the forwarding the request for data to the data provider includes forwarding the user credentials to the data provider.

Example 4

The system of example 2 or 3, wherein the encrypting includes two phases of encryption, the two phases of encryption including a first phase in which the sensitive data 204 is encrypted and a second phase in which the encrypted sensitive data 204 is encapsulated in a capsule with the policy constraints.

Example 5

The system of any of examples 1-4, wherein data privacy module 108 is designed to enforce the one or more requirements identified in the policy constraints 202 by checking one or more contextual attributes of the end-user device 104 each time the sensitive data 204 is accessed on the end-user device 104 and limiting access if the one or more contextual attributes do not meet the one or more requirements identified in the policy constraints 202.

Example 6

The system of any of examples 1-5, wherein the policy constraints 202 further includes one or more obligations on use of the sensitive data 204 and the data privacy module 108 is designed to enforce the one or more obligations, limiting use of the sensitive data 204 when accessed.

Example 7

A method comprising:
receiving, from an end-user device 104, a request for data, the request including one or more contextual attributes of the end-user device 104;
forwarding the request for data to a data provider;
receiving the data from the data provider;
determining if the data from the data provider includes tagged sensitive data 204;
in response to a determination that the data from the data provider includes tagged sensitive data 204;
sending the tagged sensitive data 204 and the one or more contextual attributes to a data access platform 122;
receiving, from the data access platform 122, policy constraints 202 corresponding to the data;
encrypting the sensitive data 204 in a manner that a data privacy module 108 on the end-user device 104 only decrypts the sensitive data 204 when one or more contextual attributes of the end-user device 104 meet one or more requirements identified in the policy constraints 202; and
sending the encrypted sensitive data 204 and the policy constraints 202 to the data privacy module 108 on the end-user device 104.

Example 8

The method of example 7, further comprising:
authenticating a user 110 of the end-user device 104 by passing user credentials to an identify provider and receiving an indication that the user 110 is authentic.

Example 9

The method of example 8, wherein the forwarding the request for data to the data provider includes forwarding the user credentials to the data provider.

Example 10

The method of examples 8 or 9, wherein the encrypting includes two phases of encryption, the two phases of encryption including a first phase in which the sensitive data 204 is encrypted and a second phase in which the encrypted sensitive data 204 is encapsulated in a capsule with the policy constraints.

Example 11

The method of any of examples 7-10, wherein the data privacy module 108 is designed to enforce the one or more requirements identified in the policy constraints 202 by checking one or more contextual attributes of the end-user device 104 each time the sensitive data 204 is accessed on the end-user device 104 and limiting access if the one or more contextual attributes do not meet the one or more requirements identified in the policy constraints 202.

Example 12

The method of any of examples 7-10, wherein the policy constraints 202 further includes one or more obligations on use of the sensitive data 204 and the data privacy module 108 is designed to enforce the one or more obligations, limiting use of the sensitive data 204 when accessed.

Example 13

The method of any of examples 7-10, wherein the data privacy module 108 is included in an application 720 on the end-user device 104 as part of a library in a software developer kit (SDK).

Example 14

A non-transitory machine-readable storage medium comprising instructions 816 which, when implemented by one or more machines 800, cause the one or more machines 800 to perform operations comprising:
receiving, from an end-user device 104, a request for data, the request including one or more contextual attributes of the end-user device 104;
forwarding the request for data to a data provider;
receiving the data from the data provider;
determining if the data from the data provider includes tagged sensitive data 204;
in response to a determination that the data from the data provider includes tagged sensitive data 204;
sending the tagged sensitive data 204 and the one or more contextual attributes to a data access platform 122;
receiving, from the data access platform 122, policy constraints 202 corresponding to the data;
encrypting the sensitive data 204 in a manner that a data privacy module 108 on the end-user device 104 only decrypts the sensitive data 204 when one or more contextual attributes of the end-user device 104 meet one or more requirements identified in the policy constraints 202; and
sending the encrypted sensitive data 204 and the policy constraints 202 to the data privacy module 108 on the end-user device 104.

Example 15

The non-transitory machine-readable storage medium of example 14, wherein the instructions 816 further cause the one or more machines 800 to perform operations comprising:
authenticating a user 110 of the end-user device 104 by passing user credentials to an identify provider 112 and receiving an indication that the user 110 is authentic.

Example 16

The non-transitory machine-readable storage medium of example 15, wherein the forwarding the request for data to the data provider includes forwarding the user credentials to the data provider.

Example 17

The non-transitory machine-readable storage medium of examples 15 or 16, wherein the encrypting includes two phases of encryption, the two phases of encryption including a first phase in which the sensitive data 204 is encrypted and a second phase in which the encrypted sensitive data 204 is encapsulated in a capsule with the policy constraints.

Example 18

The non-transitory machine-readable storage medium of any of examples 14-17, wherein data privacy module 108 is designed to enforce the one or more requirements identified in the policy constraints by checking one or more contextual attributes of the end-user device 104 each time the sensitive data 204 is accessed on the end-user device 104 and limiting access if the one or more contextual attributes do not meet the one or more requirements identified in the policy constraints 202.

Example 19

The non-transitory machine-readable storage medium of any of examples 14-17, wherein the policy constraints 202 further includes one or more obligations on use of the sensitive data 204 and the data privacy module 108 is designed to enforce the one or more obligations, limiting use of the sensitive data 204 when accessed.

Example 20

The non-transitory machine-readable storage medium of any of examples 14-17, wherein the data privacy module 108 is included in an application 720 on the end-user device 104 as part of a library in a software developer kit (SDK).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application 106 or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications 106, and so forth described in conjunction with FIGS. 1-6 are implemented, in some embodiments, in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 7:
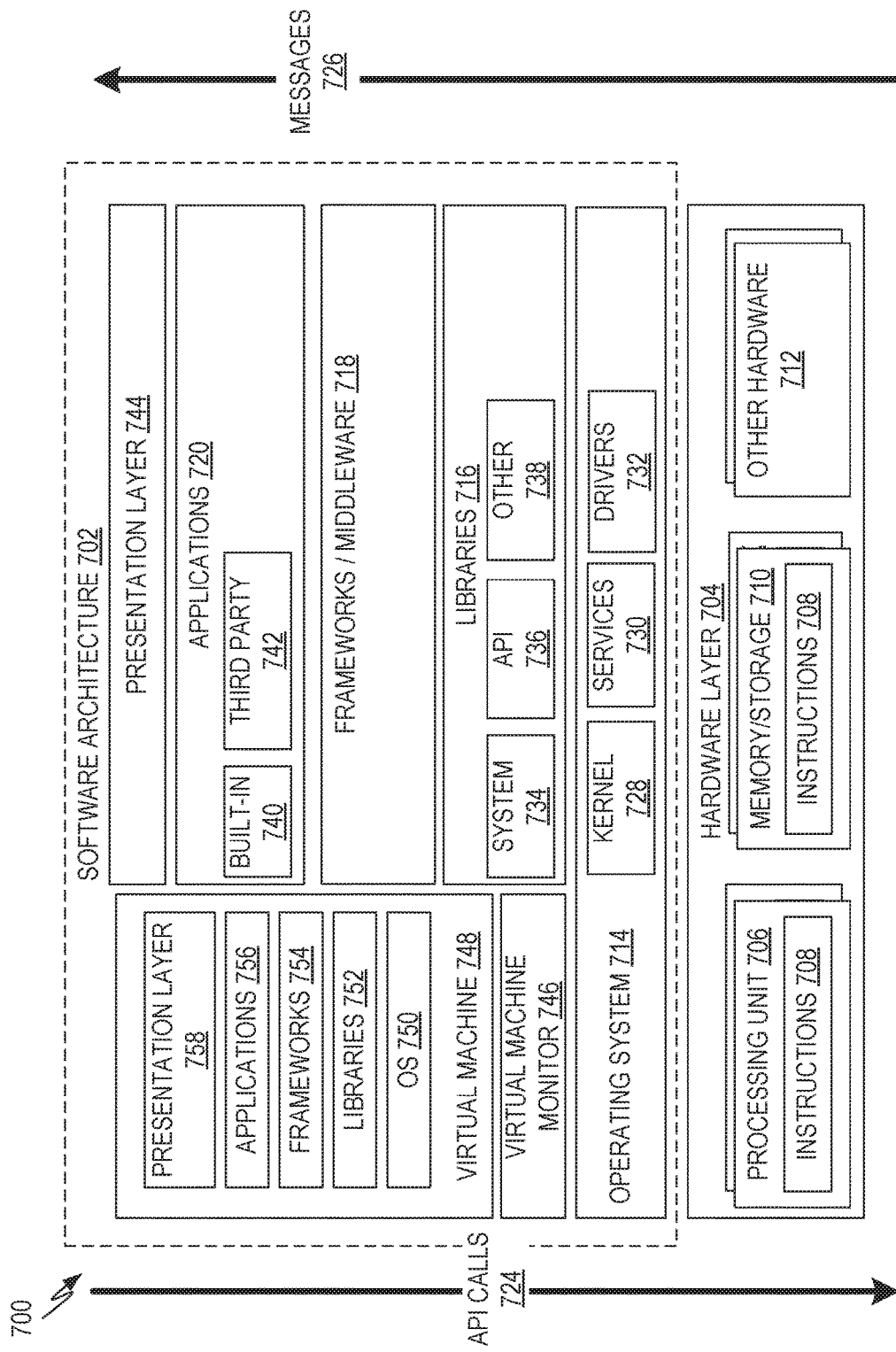
FIG. 7 is a block diagram illustrating a representative software architecture, which may be used in conjunction with various hardware architectures herein described.

FIG. 7 is a block diagram 700 illustrating a representative software architecture 702, which may be used in conjunction with various hardware architectures herein described. FIG. 7 is merely a non-limiting example of a software architecture 702, and it will be appreciated that many other architectures may be implemented to facilitate the functionality described herein. The software architecture 702 may be executing on hardware such as a machine 800 of FIG. 8 that includes, among other things, processors 810, memory/storage 830, and I/O components 850. A representative hardware layer 704 is illustrated and can represent, for example, the machine 800 of FIG. 8. The representative hardware layer 704 comprises one or more processing units 706 having associated executable instructions 708. The executable instructions 708 represent the executable instructions of the software architecture 702, including implementation of the methods, modules, and so forth of FIGS. 1-6. The hardware layer 704 also includes memory and/or storage modules 710, which also have the executable instructions 708. The hardware layer 704 may also comprise other hardware 712, which represents any other hardware of the hardware layer 704, such as the other hardware illustrated as part of the machine 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720, and a presentation layer 744. Operationally, the applications 720 and/or other components within the layers may invoke application programming interface (API) calls 724 through the software stack and receive a response, returned values, and so forth illustrated as messages 726 in response to the API calls 724. The layers illustrated are representative in nature, and not all software architectures have all layers. For example, some mobile or special purpose operating systems may not provide a frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730, and/or drivers 732). The libraries 716 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic context on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks/middleware 718 may provide a higher-level common infrastructure that may be utilized by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system 714 or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any of the built-in applications 740 as well as a broad assortment of other applications. In a specific example, the third-party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 742 may invoke the API calls 724 provided by the mobile operating system such as the operating system 714 to facilitate functionality described herein.

The applications 720 may utilize built-in operating system functions (e.g., kernel 728, services 730, and/or drivers 732), libraries (e.g., system libraries 734, API libraries 736, and other libraries 738), and frameworks/middleware 718 to create user interfaces to interact with users 110 of the system. Alternatively, or additionally, in some systems, interactions with a user 110 may occur through a presentation layer, such as the presentation layer 744. In these systems, the application/module "logic" can be separated from the aspects of the application/module that interact with a user 110.

Some software architectures utilize virtual machines. In the example of FIG. 7, this is illustrated by a virtual machine 748. A virtual machine 748 creates a software environment where applications 720/modules can execute as if they were executing on a hardware machine (such as the machine 800 of FIG. 8, for example). The virtual machine 748 is hosted by a host operating system (operating system 714 in FIG. 7) and typically, although not always, has a virtual machine monitor 746, which manages the operation of the virtual machine 748 as well as the interface with the host operating system (i.e., operating system 714). A software architecture executes within the virtual machine 748, such as an operating system 750, libraries 752, frameworks/middleware 754, applications 756, and/or a presentation layer 758. These layers of software architecture 702 executing within the virtual machine 748 can be the same as corresponding layers previously described or may be different.

Example Machine Architecture and Machine-Readable Medium

Figure 8:
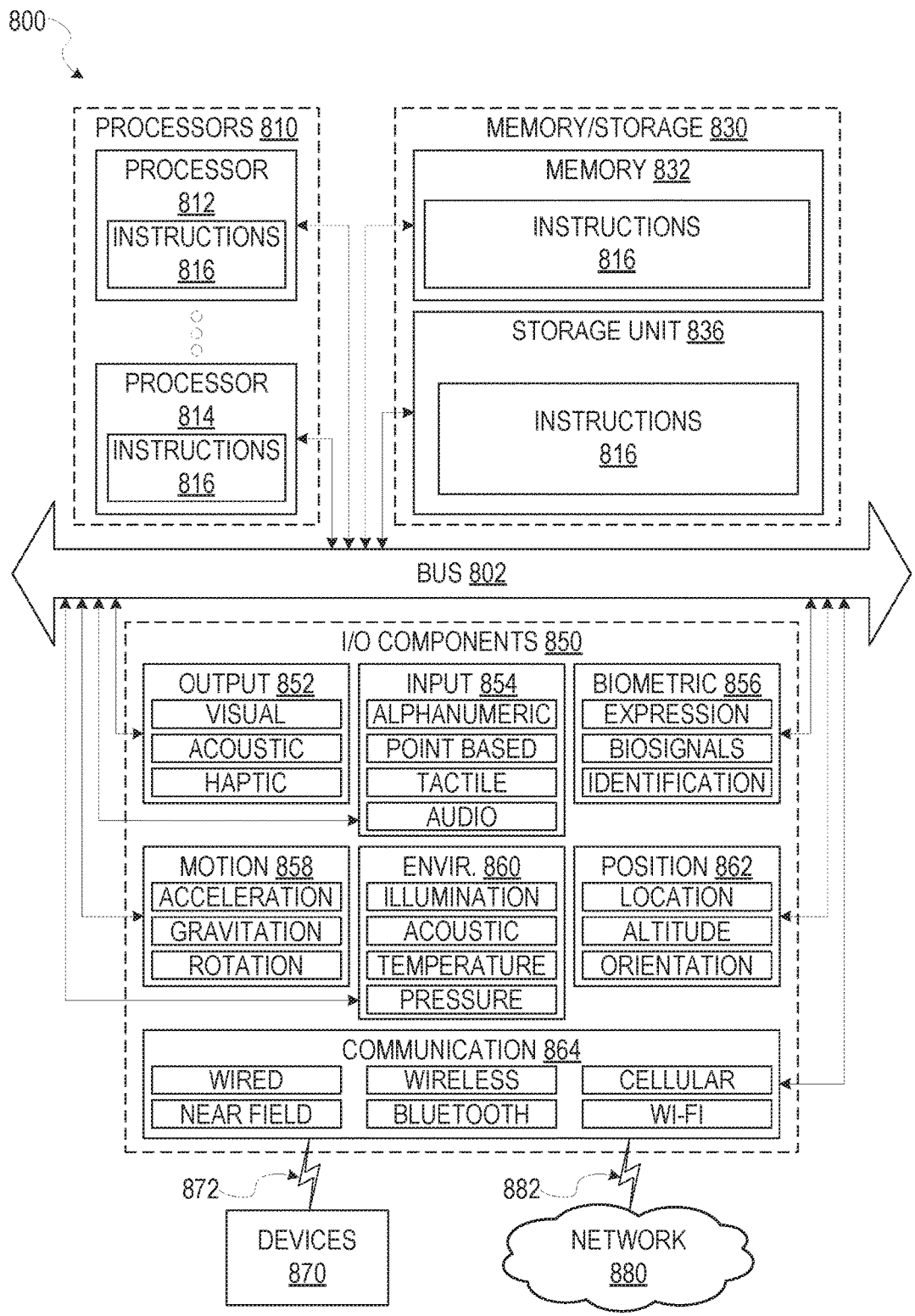
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 816 from a machine-readable medium (e.g., a machine-readable storage medium) and perform any one or more of the methodologies discussed herein. Specifically, FIG. 8 shows a diagrammatic representation of the machine 800 in the example form of a computer system, within which the instructions 816 (e.g., software, a program, an application 720, an applet, an app, or other executable code) for causing the machine 800 to perform any one or more of the methodologies discussed herein may be executed. For example, the instructions 816 may cause the machine 800 to execute the flow diagrams of FIGS. 4-6. Additionally, or alternatively, the instructions 816 may implement modules of FIG. 1, and so forth. The instructions 816 transform the general, non-programmed machine 800 into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/ storage 830, and I/O components 850, which may be configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) may include, for example, a processor 812 and a processor 814 that may execute the instructions 816. The term "processor" is intended to include a multi-core processor 812, 814 that may comprise two or more independent processors 812, 814 (sometimes referred to as "cores") that may execute the instructions 816 contemporaneously. Although FIG. 8 shows multiple processors 810, the machine 800 may include a single processor 812, 814 with a single core, a single processor 812, 814 with multiple cores (e.g., a multi-core processor 812, 814), multiple processors 812, 814 with a single core, multiple processors 812, 814 with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor 812, 814's cache memory), or any suitable combination thereof, during execution thereof by the machine 800. Accordingly, the memory 832, the storage unit 836, and the memory of the processors 810 are examples of machine-readable media.

As used herein, "machine-readable medium" means a device able to store the instructions 816 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions 816, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine 800 will depend on the type of machine 800. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion, and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a mobile services cloud platform comprising one or more processors configured to:
receive, from an end-user device, a request for data, the request including one or more contextual attributes of the end-user device;
forward the request for data to a data provider;
receive the data from the data provider;
determine if the data from the data provider includes tagged sensitive data, wherein the tagged sensitive data is data that has been labeled as sensitive;
in response to a determination that the data from the data provider includes tagged sensitive data:
send the tagged sensitive data and the one or more contextual attributes of the end-user device to a data access platform;
receive, from the data access platform, policy constraints corresponding to the tagged sensitive data;
encrypt the tagged sensitive data in a manner that a data privacy module on the end-user device only decrypts the tagged sensitive data when one or more contextual attributes of the end-user device meet one or more requirements identified in the policy constraints; and
send the encrypted tagged sensitive data and the policy constraints to the data privacy module on the end-user device.

2. The system of claim 1, wherein the mobile services cloud platform is further configured to:
authenticate a user of the end-user device by passing user credentials to an identify provider and receiving an indication that the user is authentic.

3. The system of claim 2, wherein the forwarding the request for data to the data provider includes forwarding the user credentials to the data provider.

4. The system of claim 2, wherein the encrypting includes two phases of encryption, the two phases of encryption including a first phase in which the tagged sensitive data is encrypted and a second phase in which the encrypted tagged sensitive data is encapsulated in a capsule with the policy constraints.

5. The system of claim 1, wherein data privacy module is designed to enforce the one or more requirements identified in the policy constraints by checking one or more contextual attributes of the end-user device each time the tagged sensitive data is accessed on the end-user device and limiting access if the one or more contextual attributes do not meet the one or more requirements identified in the policy constraints.

6. The system of claim 1, wherein the policy constraints further includes one or more conditions on use of the tagged sensitive data and the data privacy module is designed to enforce the one or more obligations, limiting use of the tagged sensitive data when accessed.

7. A method comprising:
receiving, from an end-user device, a request for data, the request including one or more contextual attributes of the end-user device;
forwarding the request for data to a data provider;
receiving the data from the data provider;
determining if the data from the data provider includes tagged sensitive data, wherein the tagged sensitive data is data that has been labeled as sensitive;
in response to a determination that the data from the data provider includes tagged sensitive data;
sending the tagged sensitive data and the one or more contextual attributes of the end-user device to a data access platform;
receiving, from the data access platform, policy constraints corresponding to the tagged sensitive data;
encrypting the tagged sensitive data in a manner that a data privacy module on the end-user device only decrypts the tagged sensitive data when one or more contextual attributes of the end-user device meet one or more requirements identified in the policy constraints; and
sending the encrypted tagged sensitive data and the policy constraints to the data privacy module on the end-user device.

8. The method of claim 7, further comprising:
authenticating a user of the end-user device by passing user credentials to an identify provider and receiving an indication that the user is authentic.

9. The method of claim 8, wherein the forwarding the request for data to the data provider includes forwarding the user credentials to the data provider.

10. The method of claim 8, wherein the encrypting includes two phases of encryption, the two phases of encryption including a first phase in which the tagged sensitive data is encrypted using policy and context ciphertext and a second phase in which the encrypted tagged sensitive data is encapsulated in a capsule with the policy constraints and the policy constraints and the capsule is encrypted using identity and data ciphertext.

11. The method of claim 7, wherein the data privacy module is designed to enforce the one or more requirements identified in the policy constraints by checking one or more contextual attributes of the end-user device each time the tagged sensitive data is accessed on the end-user device and limiting access if the one or more contextual attributes does not meet the one or more requirements identified in the policy constraints.

12. The method of claim 7, wherein the policy constraints further include one or more obligations on use of the tagged sensitive data and the data privacy module is designed to enforce the one or more obligations, limiting use of the tagged sensitive data when accessed.

13. The method of claim 7, wherein the data privacy module is included in an application on the end-user device as part of a library in a software developer kit (SDK).

14. A non-transitory machine-readable storage medium comprising instructions which, when implemented by one or more machines, cause the one or more machines to perform operations comprising:
receiving, from an end-user device, a request for data, the request including one or more contextual attributes of the end-user device;
forwarding the request for data to a data provider;
receiving the data from the data provider;
determining if the data from the data provider includes tagged sensitive data, the wherein tagged sensitive data is data that has been labeled as sensitive;

in response to a determination that the data from the data provider includes tagged sensitive data;

sending the tagged sensitive data and the one or more contextual attributes of the end-user device to a data access platform;

receiving, from the data access platform, policy constraints corresponding to the tagged sensitive data;

encrypting the tagged sensitive data in a manner that a data privacy module on the end-user device only decrypts the tagged sensitive data when one or more contextual attributes of the end-user device meet one or more requirements identified in the policy constraints; and sending the encrypted tagged sensitive data and the policy constraints to the data privacy module on the end-user device.

15. The non-transitory machine-readable storage medium of claim 14, wherein the instructions further cause the one or more machines to perform operations comprising:

authenticating a user of the end-user device by passing user credentials to an identify provider and receiving an indication that the user is authentic.

16. The non-transitory machine-readable storage medium of claim 15, wherein the forwarding the request for data to the data provider includes forwarding the user credentials to the data provider.

17. The non-transitory machine-readable storage medium of claim 15, wherein the encrypting includes two phases of encryption, the two phases of encryption including a first phase in which the tagged sensitive data is encrypted and a second phase in which the encrypted tagged sensitive data is encapsulated in a capsule with the policy constraints.

18. The non-transitory machine-readable storage medium of claim 14, wherein the data privacy module is designed to enforce the one or more requirements identified in the policy constraints by checking one or more contextual attributes of the end-user device each time the tagged sensitive data is accessed on the end-user device and limiting access if the one or more contextual attributes do not meet the one or more requirements identified in the policy constraints.

19. The non-transitory machine-readable storage medium of claim 14, wherein the policy constraints further include one or more obligations on use of the tagged sensitive data and the data privacy module is designed to enforce the one or more obligations, limiting use of the tagged sensitive data when accessed.

20. The non-transitory machine-readable storage medium of claim 14, wherein the data privacy module is included in an application on the end-user device as part of a library in a software developer kit (SDK).

* * * * *